Sept. 24, 1957  T. M. LUCAS  2,807,297

TAPERED FLANGE FORMING TOOL

Filed April 20, 1956

INVENTOR.
THOMAS M. LUCAS
BY
McMorrow, Berman & Davidson
ATTORNEYS

United States Patent Office 2,807,297
Patented Sept. 24, 1957

2,807,297
TAPERED FLANGE FORMING TOOL
Thomas M. Lucas, Newburgh, N. Y.
Application April 20, 1956, Serial No. 579,596
5 Claims. (Cl. 144—205)

This invention relates generally to hand tools and is more particularly concerned with a novel tapered flange forming tool for forming an annular tapered flange on the end of fibrous conduit or the like for the accommodation of an internally tapered coupling sleeve whereby a plurality of said conduits may be sealingly secured in aligned relationship.

Fibrous conduit of the character involved is formed with a factory machined taper on the ends of each length thereof for accommodating thereon a mating taper in a sleeve coupling. However, when out in the field, when the conduit has to be sawed into shorter lengths it is necessary to form or machine a taper on the end thereof facilitating the accommodation of the mating taper of a sleeve coupling thereon.

A primary object of invention is to provide a novel tool for forming an annular tapered flange on the end fibrous conduit which includes means for readily and expeditiously forming said tapered flange to accommodate thereon a sleeve coupling taper in sealed relationship therewith.

Another object of invention in conformance with that set forth is to provide a novel tool of the character involved which includes an elongated tubular mandrel member insertable in the end of a conduit upon which a tapered flange is to be formed, said mandrel member expandingly conforming to the inner periphery of the conduit and including means thereon for rotating said mandrel member about its longitudinal axis within the conduit, and including a longitudinally extending blade member secured on the outer periphery of the mandrel member in rearwardly disposed relationship relative to the end of the mandrel member to be inserted within the conduit, and including means for securing the blade member in outwardly extending angular relationship relative to the longitudinal axis of said mandrel member whereby rotation of the same within the conduit will form a tapered annular flange on the end portion of said conduit member.

Other objects of the invention in conformance with that set forth reside in the specific means for adjusting the relative outwardly extending angular relationship of the blade member relative to the mandrel member, the specific construction of the mandrel member, and the inclusion of a second blade member for truing the edge of the conduit upon which the annular tapered flange is being formed.

And yet a still further object of invention in conformance with that set forth is to provide a novel tool of the character involved which is readily and expeditiously manufactured, easily used, adjusted and maintained, and highly satisfactory, serviceable and practical for the purpose intended.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
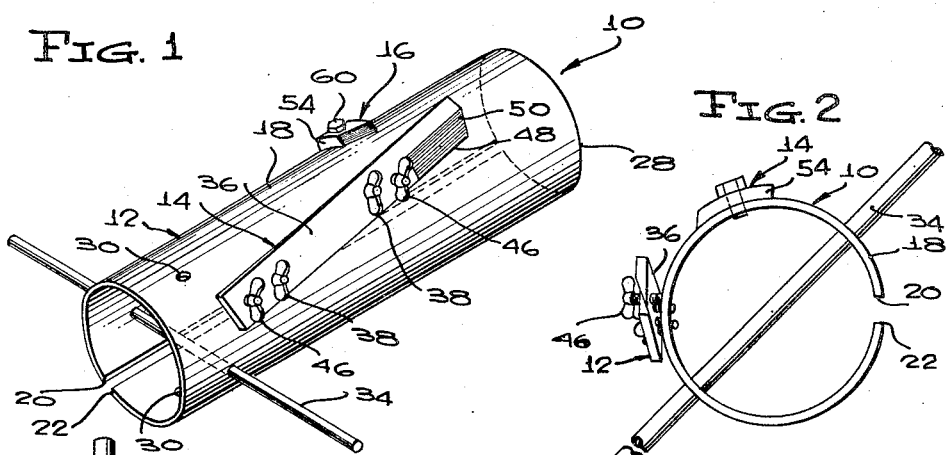
Figure 1 is a perspective view of the novel tool.
Figure 2:
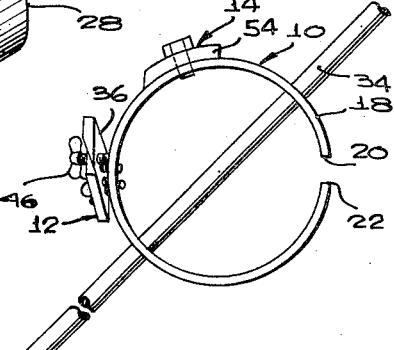
Figure 2 is an end elevational view of the novel tool looking through the interior of the mandrel member thereof.
Figure 3:
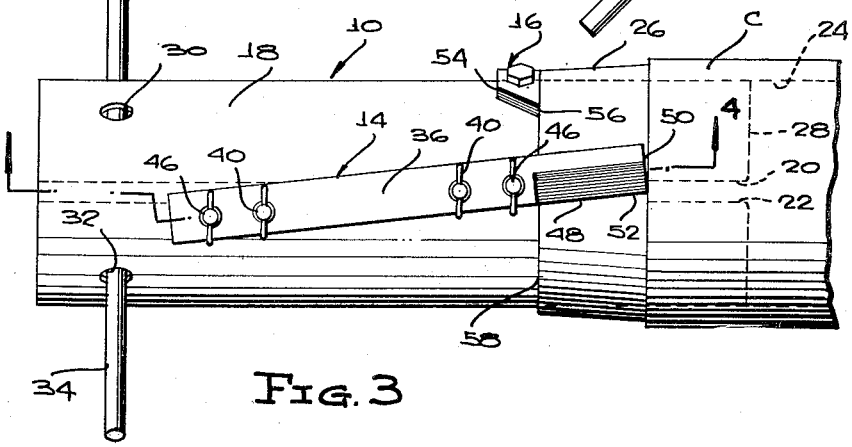
Figure 3 is a top elevational view of the novel tool showing the same in operative position in an end portion of a conduit upon which the tapered flange has been formed.

Referring to the drawing in detail, the novel tool is indicated generally at 10 including a mandrel member 12, an annular tapered flange cutting blade member 14, and a second blade member 16 for truing the end of a conduit after a predetermined length of tapered annular flange has been formed thereon.

The mandrel member 12 comprises an arcuately conformed sheet of resilient material, spring steel for example, indicated at 18 which substantially defines an open ended cylinder, the cylinder being split with the edge portions 20 and 22 of said mandrel member being substantially parallel and permitting said mandrel member to expandingly conform to the inner periphery 24 of a fibrous conduit C upon which a suitable tapered annular flange 26 is to be formed. The end portion 28 of the mandrel member is rotatably received within the conduit C, and said mandrel member may have extending therethrough aligned aperture portions 30 and 32 adjacent its other end for receiving therethrough a suitable transversely disposed rod member 34 serving as a handle for rotating the mandrel member about its longitudinal axis. Although the handle member 34 has been disclosed as the means for rotating the mandrel member, suitable means may be adopted therewith wherein the mandrel member may be rotated by means of a hand drill, for example.

Figure 4:
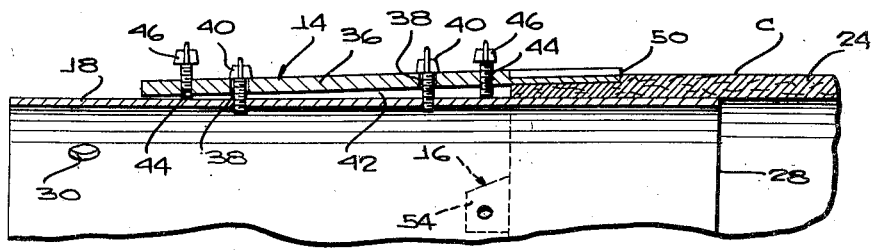
Figure 4 is a fragmentary sectional view taken substantially on line 4—4 of Figure 3.

The blade member 14 includes an elongated body portion 36 which extends longitudinally along the outer periphery of the mandrel member, said body portion 36 having extending transversely therethrough, see Figure 4, longitudinally spaced aperture portions 38 which have extending therethrough threaded fastening elements 40 received in suitable transverse threaded aperture portions disposed in underlying transverse relationship in the outer periphery of the mandrel member. The fastening elements 40 will clampingly engage the upper surface portion of the body portion 36 of said blade member 14. As clearly seen in Figure 4, the body portion 36 of the blade member 14 is angularly disposed at 42 relative to the longitudinal axis of the mandrel member, said angle being adjustable to conform with the degree of taper specified by the manufacturer of the sleeve couplings having an internal tapered portion conforming to the annular tapered flange to be formed on the conduit C. In order to maintain the predetermined angle 42 the body portion 36 has extending through internally threaded aperture portions 44, disposed outwardly of the previously mentioned apertures 38, abutment or stop screws 46, inner end portions of which being engageable with the outer periphery of said mandrel member. By suitably adjusting the abutment screws 46 as clearly seen in Figure 4, for example, the predetermined angularity of the blade member 14 may be obtained and fixed even though the blade member 14 is subsequently removed from the mandrel member by loosening the fastening elements 40. It will be noted that the aperture portions 38 are oversized or of a greater diameter than the threaded portion of the fastening elements 40 permitting the angular disposition of the blade member 14 relative to the fastening elements 40.

The blade member 14 includes on the body portion 36 a forward longitudinally disposed cutting edge portion 48 which terminates at 50 inwardly of the end 28 of the mandrel member, thus the mandrel member extends a substantial distance into the conduit upon which the annular tapered flange is being formed providing sufficient support for the rotation of the tool. The blade member 14 is disposed in angular relationship relative to the transverse axis of the mandrel member providing a trailing cutting edge portion 52 which first attaches the material being shaved away from the conduit C to form the annular tapered flange thereon, this angular disposition of the cutting blade member 14 reducing the stress on the cutting edge portion 48 of the blade member 14.

The second blade member 16 is disposed transversely on the outer periphery of the mandrel member in rearwardly disposed relationship relative to the end 50 of the cutter member 14, said second cutter member 16 including a body portion 54 formed with an outwardly extending cutting portion 56 engageable with the end 58 of the conduit engageable therewith after a predetermined length of annular tapered flange has been formed on said conduit.

Obviously, the tool may be utilized without the second cutter member 16, said member being removably retained by means of a suitable fastening element 60 in the previously mentioned transverse relationship on the outer periphery of the mandrel member.

Thus there has been disclosed a novel tool for forming annular tapered flanges on fibrous conduits and the like which fully conforms with the objects of invention heretofore set forth.

Various positional directional terms such as "outer," "inner," etc. utilized herein to have only a relative connotation to aid in describing the device and it is not intended to require any particular orientation with respect to any exernal elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted, falling within the scope of the appended claims.

What is claimed is:

1. A tool for forming an annular tapered flange on the end of fibrous conduit or the like comprising an elongated tubular mandrel member adapted for insertion of one end portion thereof into an end portion of a conduit upon which a tapered flange is to be formed, said mandrel member being split so as to expandingly conform to the inner periphery of the conduit, means engageable with the mandrel member for rotating it about its longitudinal axis when the one end portion of said mandrel member has been inserted in the end portion of the conduit, and a blade member secured in longitudinally extending relationship on the outer periphery of the mandrel member and including a longitudinal cutting edge portion inwardly disposed relative to the one end portion of the mandrel member, the cutting edge portion of said blade member being in contacting engagement with the adjacent part of the outer periphery of the conduit when the one end portion of said mandrel member has been inserted in the end portion of the conduit, and means securing the blade member in outwardly extending angular relationship relative to the longitudinal axis of said mandrel member for forming an annular tapered flange on conduit within which the mandrel member is rotated.

2. A tool for forming an annular tapered flange on the end of fibrous conduit or the like comprising an elongated tubular mandrel member adapted for insertion of one end portion thereof into an end portion of a conduit upon which a tapered flange is to be formed, said mandrel member being split so as to expandingly conform to the inner periphery of the conduit, means engageable with the mandrel member for rotating it about its longitudinal axis when the one end portion of said mandrel member has been inserted in the end portion of the conduit, and a blade member secured in longitudinally extending relationship on the outer periphery of the mandrel member and including a longitudinal cutting edge portion inwardly disposed relative to the one end portion of the mandrel member, the cutting edge portion of said blade member being in contacting engagement with the adjacent part of the outer periphery of the conduit when the one end portion of said mandrel member has been inserted in the end portion of the conduit, means securing the blade member in outwardly extending angular relationship relative to the longitudinal axis of said mandrel member for forming an annular tapered flange on conduit within which the mandrel member is rotated, and a second cutter blade member secured in transverse relationship on the outer periphery of the mandrel member intermediately of the first mentioned blade member for trueing up the edge of the conduit after a predetermined length of tapered annular flange has been formed thereon.

3. A tool for forming an annular tapered flange on the end of fibrous conduit or the like comprising an elongated tubular mandrel member adapted for insertion of one end portion thereof into an end portion of a conduit upon which a tapered flange is to be formed, said mandrel member expandingly conforming to the inner periphery of the conduit, means engageable with the mandrel member for rotating it about its longitudinal axis when the one end portion of said mandrel member has been inserted in the end portion of the conduit, and a blade member secured in longitudinally extending relationship on the outer periphery of the mandrel member and including a longitudinal cutting edge portion inwardly disposed relative to the one end portion of the mandrel member, the cutting edge portion of said blade member being in contacting engagement with the adjacent part of the outer periphery of the conduit when the one end portion of said mandrel member has been inserted in the end portion of the conduit, and means securing the blade member in outwardly extending angular relationship relative to the longitudinal axis of said mandrel member for forming an annular tapered flange on conduit within which the mandrel member is rotated, said mandrel member comprising an arcuately conformed sheet of resilient material substantially defining an open ended cylinder and including adjacent edge portions disposed in spaced parallel relationship defining an elongated slot extending the length of said mandrel member.

4. A tool for forming an annular tapered flange on the end of fibrous conduit or the like comprising an elongated tubuluar mandrel member adapted for insertion of one end portion thereof into an end portion of a conduit upon which a tapered flange is to be formed, said mandrel member being split so as to expandingly conform to the inner periphery of the conduit, means engageable with the mandrel member for rotating it about its longitudinal axis when the one end portion of said mandrel member has been inserted in the end portion of the conduit, and a blade member secured in longitudinally extending relationship on the outer periphery of the mandrel member and including a longitudinal cutting edge portion inwardly disposed relative to the one end portion of the mandrel member, the cutting edge portion of said blade member being in contacting engagement with the adjacent part of the outer periphery of the conduit when the one end portion of said mandrel member has been inserted in the end portion of the conduit, and means securing the blade member in outwardly extending angular relationship relative to the longitudinal axis of said mandrel member for forming an annular tapered flange on conduit within which the mandrel member is rotated, the means securing the blade member on the mandrel member including means for adjusting the outwardly extending angular relationship of the blade member relative to the mandrel member.

5. A tool for forming an annular tapered flange on the end of fibrous conduit or the like comprising an elongated tubular mandrel member adapted for insertion of one end portion thereof into an end portion of a conduit upon which a tapered flange is to be formed, said mandrel member being split so as to expandingly conform to the inner periphery of the conduit, means engageable with the mandrel member for rotating about its longitudinal axis when the one end portion of said mandrel member has been inserted in the end portion of the conduit, and a blade member secured in longitudinally extending relationship on the outer periphery of the mandrel member and including a longitudinal cutting edge portion inwardly disposed relative to the one end portion of the mandrel member, the cutting edge portion of said blade member being in contacting engagement with the adjacent part of the outer periphery of the conduit when the one end portion of said mandrel member has been inserted in the end portion of the conduit, and means securing the blade member in outwardly extending relationship relative to the longitudinal axis of said mandrel member for forming an annular tapered flange on conduit within which the mandrel member is rotated, said blade member comprising an elongated body portion, a pair of longitudinally spaced apertures extending through intermediate portions of the body portion, fastening elements extending loosely through the aperture portions and received in underlying threaded aperture portions extending into the mandrel member for clampingly engaging upper surface portions of said body portion, internally threaded aperture portions extending through the body portion on opposite sides of the first mentioned aperture portions, and transversely adjustable abutment screw elements engageable with the outer periphery of the mandrel member for positioning the cutter member in adjusted relationship relative to the outer periphery of said mandrel member.

References Cited in the file of this patent

UNITED STATES PATENTS

| | | |
|---|---|---|
| 2,595,541 | Riordan | May 6, 1952 |
| 2,616,462 | Haddican | Nov. 4, 1952 |